US011254078B2

(12) United States Patent
Jiang et al.

(10) Patent No.: US 11,254,078 B2
(45) Date of Patent: Feb. 22, 2022

(54) METHOD FOR MANUFACTURING AN OPHTHALMIC ARTICLE

(71) Applicant: ESSILOR INTERNATIONAL, Charenton-le-Pont (FR)

(72) Inventors: Peiqi Jiang, Dallas, TX (US); Jean-Marc Padiou, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 61 days.

(21) Appl. No.: 16/349,808

(22) PCT Filed: Oct. 25, 2017

(86) PCT No.: PCT/EP2017/077224
§ 371 (c)(1),
(2) Date: May 14, 2019

(87) PCT Pub. No.: WO2018/086880
PCT Pub. Date: May 17, 2018

(65) Prior Publication Data
US 2019/0358920 A1 Nov. 28, 2019

(30) Foreign Application Priority Data
Nov. 14, 2016 (EP) .................................... 16306487

(51) Int. Cl.
*B29D 11/00* (2006.01)
*G02C 7/10* (2006.01)
*G02C 7/12* (2006.01)

(52) U.S. Cl.
CPC .... *B29D 11/00942* (2013.01); *B29D 11/0073* (2013.01); *B29D 11/00644* (2013.01);
(Continued)

(58) Field of Classification Search
CPC ........ B29D 11/00942; B29D 11/00644; B29D 11/00653; B29D 11/0073
(Continued)

(56) References Cited

U.S. PATENT DOCUMENTS 1,865,691 A 7/1932 Hill
4,498,919 A 2/1985 Mann
(Continued)

FOREIGN PATENT DOCUMENTS

GB 423457 2/1935
GB 2277602 11/1994
(Continued)

OTHER PUBLICATIONS

International Search Report and Written Opinion issued in Corresponding International Patent Application No. PCT/EP2017/077224, dated Jan. 24, 2018.

*Primary Examiner* — James R Greece
(74) *Attorney, Agent, or Firm* — Norton Rose Fulbright US LLP

(57) ABSTRACT

The invention provides a method for manufacturing an ophthalmic article having at least one optical function and at least one predetermined transmission parameter, comprising the steps (102) of surfacing at least a first face of a first body of said article, made from a first material, according to a first geometry determined for providing said predetermined transmission parameters; and surfacing (103) at least a second face of a second body of said article, made from a second material, according to a second geometry determined at least according to said first geometry, for providing said optical.

20 Claims, 6 Drawing Sheets

(52) U.S. Cl.
CPC ........ *B29D 11/00653* (2013.01); *G02C 7/102* (2013.01); *G02C 7/108* (2013.01); *G02C 7/12* (2013.01)

(58) Field of Classification Search
USPC ...................................................... 351/159.7
See application file for complete search history.

(56) References Cited

U.S. PATENT DOCUMENTS

| | | | | |
|---|---|---|---|---|
| 5,800,744 | A | 9/1998 | Munakata | |
| 2003/0008149 | A1 * | 1/2003 | Moravec | G02B 5/23<br>428/412 |
| 2004/0145700 | A1 | 7/2004 | Miniutti et al. | |
| 2005/0140033 | A1 | 6/2005 | Jiang et al. | |
| 2015/0231839 | A1 | 8/2015 | Su et al. | |

FOREIGN PATENT DOCUMENTS

| | | | | |
|---|---|---|---|---|
| GB | 2277602 A | * | 11/1994 | G02C 7/105 |
| WO | WO 2016/108065 | | 7/2016 | |

* cited by examiner

Fig.5
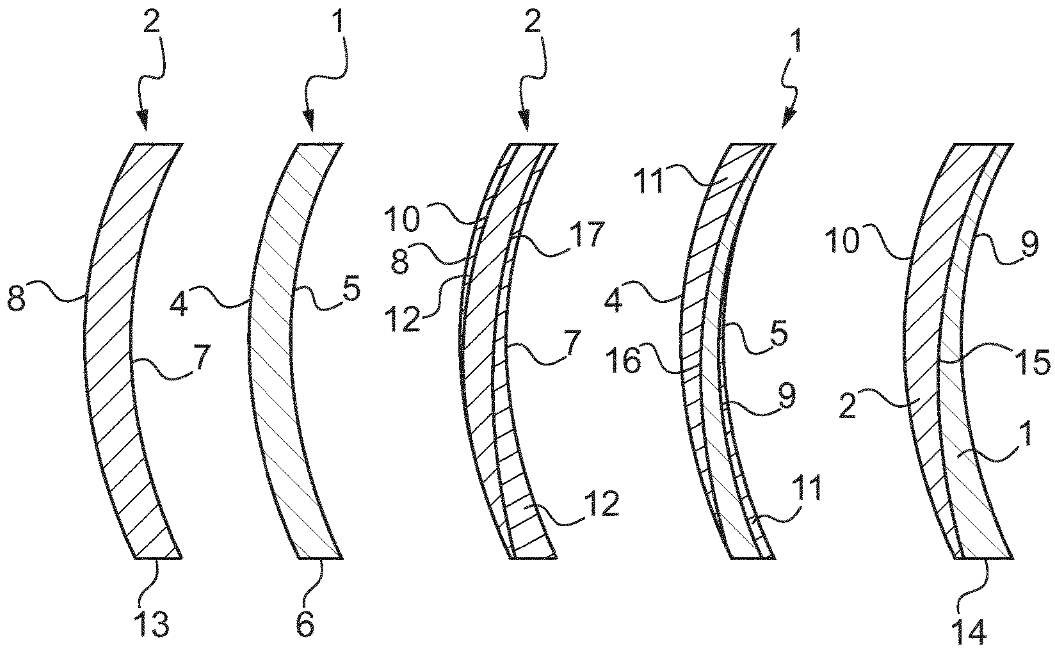
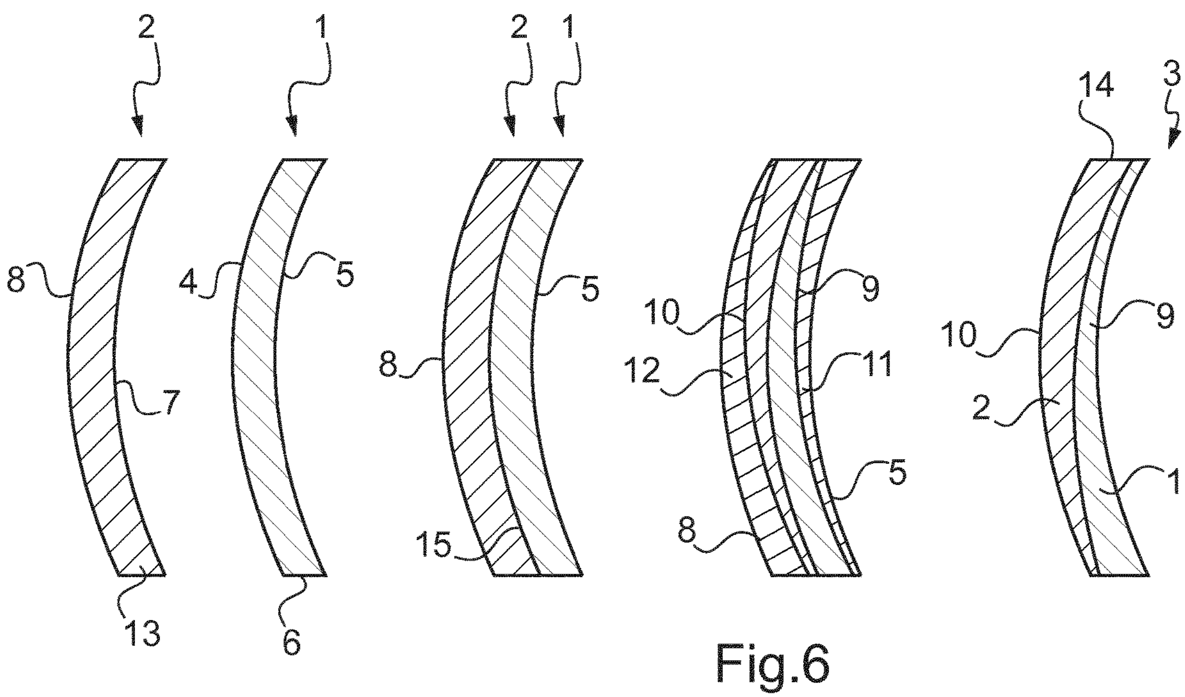
Fig.6

METHOD FOR MANUFACTURING AN OPHTHALMIC ARTICLE

CROSS-REFERENCE TO RELATED APPLICATIONS

This application is a national phase application under 35 U.S.C. § 371 of International Application No. PCT/EP2017/077224 filed 25 Oct. 2017, which claims priority to European Patent Application No. 16306487.6 filed 14 Nov. 2016. The entire contents of each the above-referenced disclosures is specifically incorporated by reference herein without disclaimer.

FIELD OF THE INVENTION

The invention relates to the field of the manufacture of ophthalmic articles, in particular ophthalmic lenses, having at least one optical function and at least one predetermined transmission parameter.

The invention relates more specifically to a method for manufacturing such ophthalmic articles and such ophthalmic articles.

BACKGROUND ART

It is known that ophthalmic lenses are subjected to various manufacturing steps in order to confer upon them the prescribed ophthalmic properties, which are, for example, complex or simple.

Methods for manufacturing ophthalmic lenses which involve a step of supplying an unfinished or semi-finished lens blank, namely a lens blank that has neither or just one face finished (in other words one face which defines a simple or complex optical surface) are known.

These methods then involve a step of machining at least one face of the so-called unfinished lens blank by surfacing (turning), in order to obtain what is referred to as a finished face, which defines for instance the complex optical surface desired for providing the (complex or otherwise) ophthalmic properties prescribed for the wearer of the ophthalmic lens.

It is also known that ophthalmic lenses are subjected to other various manufacturing steps in order to confer upon them the predetermined transmission properties, which are, in particular, polarization parameter, photochromic parameter, tint parameter or color parameter.

Methods for manufacturing ophthalmic lenses which involve a step of casting or injecting a color into a lens blank material are known. Methods for manufacturing ophthalmic lenses which involve a step of adding a polarized film or coating or a photochromic film or coating to a finished or semi-finished lens are also known.

In these methods, the steps providing ophthalmic properties and transmission properties are independent from each other. Furthermore, the step providing ophthalmic properties can be carried out before or after the machining step providing ophthalmic properties.

SUMMARY OF THE INVENTION

The invention is directed to a method for manufacturing an ophthalmic article having at least one optical function and at least one predetermined transmission parameter which is particularly simple, convenient and economical to implement.

The invention accordingly provides a method for manufacturing an ophthalmic article having at least one optical function and at least one predetermined transmission parameter, comprising the steps of surfacing, or machining by surfacing, at least a first face of a first body of said article, made from a first material, according to a first geometry determined for providing said predetermined transmission parameter; and surfacing, or machining by surfacing, at least a second face of a second body of said article, made from a second material, according to a second geometry determined at least according to said first geometry, for providing said optical function.

The method according to the invention allows to provide an ophthalmic article and in particular an ophthalmic lens having both a prescribed optical function and a customized transmission parameter.

In other words, the optical function to be conferred on the ophthalmic article is characteristic of prescription values associated with a wearer of the ophthalmic lens; while the transmission parameter to be conferred on the ophthalmic article is characteristic of customization data also associated with the wearer of ophthalmic lens.

Therefore, prescription values and customization data are both adapted to the wearer and are not standard value/data.

It will be noted that what is meant by the optical function of an ophthalmic article, is the optical response that this article has, namely a function defining any change to the propagation of an optical beam through the article, whatever the angle of incidence of the incident optical beam and whatever the geometric extent of an input diopter illuminated by the incident optical beam.

More specifically, in the field of ophthalmic, the optical function is defined as the distribution of the wearer power and astigmatism characteristics and of the higher-order aberrations associated with the article, with the system or with the optical element for all of the directions of the gaze of a wearer of this article, of this system or of this element. That of course presupposes that the geometric positioning of the article in relation to the eye of the wearer has been predetermined.

It will also be noted that both optical function and predetermined transmission parameter are here obtained thanks to machining steps, by surfacing the faces with a surfacing (or turning) machine, which is able to process either simple surfaces or complex surfaces, generally called free form surfaces, each with an high accurate level.

Thanks to such machining steps by surfacing, the method according to the invention for instance allows to process a predetermined transmission parameter defined by any spatial variation of transmission on the face machined. In other words, any photochromic gradient, polarization gradient, localized polarizing, color gradient or tint gradient can be performed.

It will also be noted that such machining steps can be performed either on at least one blank, that is to said a non-finished lens, or on a finished lens to which wearer wishes to modify at least the transmission properties.

According to features preferred as being very simple, convenient and economical for embodying the method according to the invention:

- said predetermined transmission parameters to be conferred on said ophthalmic article is characteristic of customization data amongst photochromic properties, and/or polarization properties, and/or color properties and/or tint properties, and/or specific wavelength transmission property;
- said predetermined transmission parameter corresponds either to a spatial variation of transmission on said article or to a uniform transmission on said article;

said optical function to be conferred on said ophthalmic article is characteristic of prescription values associated with a wearer of said ophthalmic article;

the method comprises the step of providing a single blank made from said first and second bodies; the single blank having two opposite external faces and a peripheral edge and the first face of the first body and the second face of the second body correspond to the two opposite external faces of the single blank;

said second body is made by casting or injection process and said first body is a film integrated to said second body during said casting or injection process;

said second body is made by casting or injection process and said first body is a film laminated or coated onto said second body;

the method comprises the step of providing said first body which has a first external face and a first internal face and the step of providing said second body which has a second external face and a second internal face;

one of each of said first external and internal faces is machined by surfacing, one of each of said second external and internal faces is machined by surfacing, and the method further comprises a step of assembling said first and second bodies which are machined by surfacing, by putting into contact said first and second internal faces;

the method comprises the step of assembling said first and second bodies provided by putting into contact said first and second internal faces, before surfacing, or machining by surfacing, so that only the first and second external faces are then machined by surfacing;

said first material is at least one of a polarizing material, photochromic material, tint material or color material;

said second material is at least one of a polarizing material, photochromic material, tint material or color material, or transparent material;

said first and second materials are similar or different;

the method further comprises a step of determining said first geometry from at least one of geometric characteristics of said first body, of said first material of said first body and of said predetermined transmission parameters to confer;

said step of determining said first geometry comprises a step of measuring said geometric characteristics of said first body;

the method further comprises a step of determining said second geometry from at least one of said first geometry of said first body, of geometric characteristics of said second body, of said second material of said second body and of said optical function to confer;

said step of determining said second geometry comprises a step of measuring said geometric characteristics of said second body and/or a step of measuring said first geometry;

both steps of surfacing, or machining by surfacing, are carried out with a digital surfacing machine; and/or said digital surfacing machine is configured to machine by surfacing said first and second bodies with an accurate level from about 1 μm to about 300 μm in order to confer to said ophtalmic article any optical function and any predetermined transmission parameter corresponding to a spatial variation of transmission between about 100% to about 0%.

The invention also relates to an ophthalmic article having at least one optical function and at least one predetermined transmission parameter, comprising a first body made from a first material and a second body made from a second material, wherein the first body comprises a first face that having a first geometry determined for providing said predetermined transmission parameters and obtained by surfacing, and the second body comprises a second face having a second geometry determined at least according to said first geometry, for providing said optical function, and obtained by surfacing.

In the ophthalmic article, said first material can be at least one of a polarizing material, photochromic material, tint material or color material, and/or said second material can be at least one of a polarizing material, photochromic material, tint material or color material, or transparent material and/or said first and second materials can be similar or different.

In the ophthalmic article, said predetermined transmission parameters to be conferred on said ophthalmic article can be characteristic of customization data amongst photochromic properties, and/or polarization properties, and/or color properties and/or tint properties and/or specific wavelength transmission property, and said optical function to be conferred on said ophthalmic article can be characteristic of prescription values associated with a wearer of said ophthalmic article.

In the ophthalmic article, the second body can be made by casting or injection process and the first body can be a film integrated to said second body during said casting or injection process, and/or said second body can made by casting or injection process and said first body can be a film laminated or coated onto said second body.

The invention furthermore relates to a system comprising system parts configured for executing the steps of the method as described above; and/or to a program comprising instructions configured to perform the steps of the method described above when said program is installed and executed in the system described above.

BRIEF DESCRIPTION OF THE DRAWINGS

The description of the invention now continues with a detailed description of preferred embodiments given hereinafter by way of non-limiting example and with reference to the appended drawings. In these drawings:

FIGS. 3 to 6 represent schematically steps of manufacturing of an ophthalmic article, according to different embodiments of the invention and thanks to the machine of FIG. 1;

DETAILED DESCRIPTION OF PREFERRED EMBODIMENTS

Figure 1:
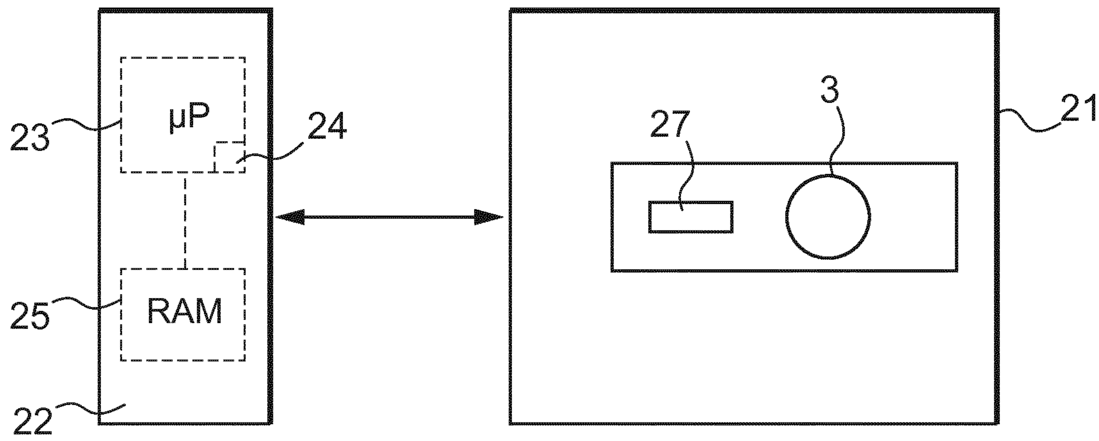
FIG. 1 schematically depicts a digital surfacing machine configured to carry out steps of a method for manufacturing an ophthalmic article according to the invention.

FIG. 1 shows a system for manufacturing an ophtalmic article 3 having at least one optical function and at least one predetermined transmission parameter.

The system comprises a manufacturing machine 21 and system parts generally formed by at least one control unit 22 configured to communicate with a data processing system (or control unit) of the machine 21.

The machine 21 is here a numerical-control "free-form" turning machine, numerical control denoting the set of equipment and software, the function of which is to give movement instructions to all the elements of the machine 21.

The machine 21 comprises a tool 27, for instance a moveable machining arm on which is mounted a cutting tool, and a data processing system or a control unit (not shown) configured for controlling the tool 27.

The control unit 22 comprises a microprocessor 23 having a memory 24, in particular a non-volatile memory, allowing it to load and store software, in other words a computer program, which when it is executed in the microprocessor 23, allows the implementation of the manufacturing method according to the invention.

This non-volatile memory 24 is for example of the ROM ("read only memory") type.

The control unit 22 further comprises a memory 25, in particular a volatile memory, allowing data to be stored during the execution of the software and the implementation of the method.

This volatile memory 25 is for example of the RAM or EEPROM type (respectively "random access memory" and "electrically erasable programmable read only memory").

The control unit may be only at least partially integrated into the machine. In other words, the control unit may be arranged in part, or in whole, outside the machine.

The control unit can form at least partially a part of the machine and may comprise one or a plurality of control modules located inside and/or outside the machine.

The machine 21 can also be configured for polishing the faces and/or for edging the peripheral edge in order to form the ophthalmic lens.

The control unit 22 is configured to control at least some of the steps of the manufacturing method described above.

Figure 2:
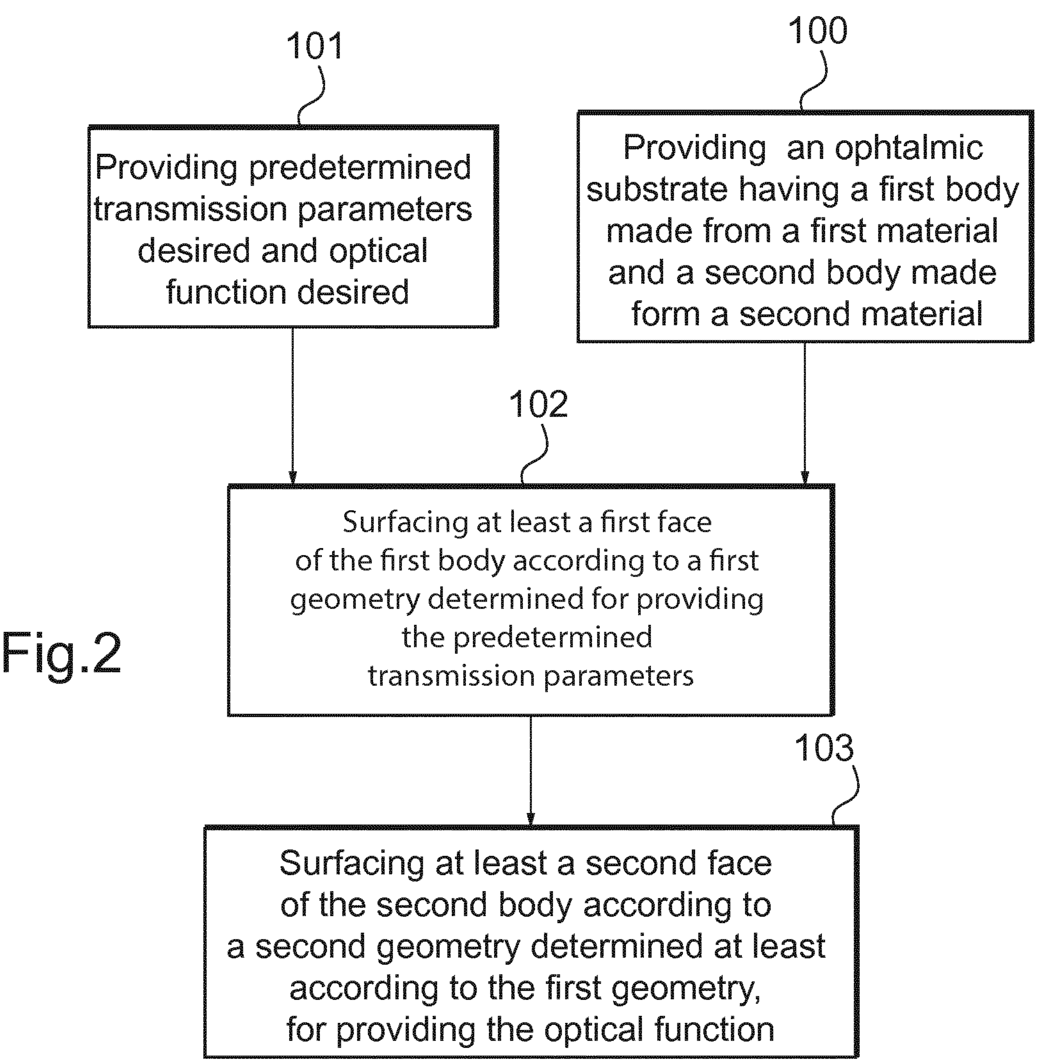
FIG. 2 is a block diagram illustrating operating steps of the method for manufacturing an ophthalmic article with the machine illustrated in FIG. 1.

FIG. 2 shows the main step of operation of a method of manufacturing the ophthalmic article 3 at least partially thanks to the machine 21 illustrated in FIG. 1.

The method comprises a step 100 of providing an ophtalmic substrate having a first body made from a first material and a second body made from a second material (see in detail below in reference to FIGS. 3 to 6).

The first material is at least one of a polarizing material, photochromic material, tint material or color material and the second material is at least one of a polarizing material, photochromic material, tint material or color material, or transparent material.

The first and second materials are similar or different

The method comprises a step 101 of providing predetermined transmission parameters desired and optical function desired and to confer to the ophtalmic substrate in order to obtain the ophtalmic article 3.

The method comprises a step 102 of surfacing, or machining by surfacing, at least a first face of the first body according to a first geometry determined for providing said predetermined transmission parameter.

The method further comprises a step 103 of surfacing, or machining by surfacing, at least a second face of the second body according to a second geometry determined at least according to the first geometry, for providing said optical function.

Here, both steps 102 and 103 of surfacing, or machining by surfacing, are carried out with the digital surfacing machine 21.

The digital surfacing machine 21 is configured to machine by surfacing the first and second bodies with an accurate level from about 1 μm to about 300 μm in order to confer to the ophtalmic article 3 any optical function and any predetermined transmission parameter corresponding to a spatial variation of transmission between about 100% to about 0%.

The method allows to provide an ophtalmic article 3 and in particular an ophtalmic lens having both a prescribed optical function and a customized transmission parameter.

In other words, the optical function to be conferred on the ophthalmic article is characteristic of prescription values associated with a wearer of the ophthalmic lens; while the transmission parameter to be conferred on the ophthalmic article is characteristic of customization data also associated with the wearer of ophthalmic lens.

Therefore, prescription values and customization data are both adapted to the wearer and are not standard value/data.

It will be noted that what is meant by the optical function of an ophthalmic article, is the optical response that this article has, namely a function defining any change to the propagation of an optical beam through the article, whatever the angle of incidence of the incident optical beam and whatever the geometric extent of an input diopter illuminated by the incident optical beam.

More specifically, in the field of ophthalmic, the optical function is defined as the distribution of the wearer power and astigmatism characteristics and of the higher-order aberrations associated with the article, with the system or with the optical element for all of the directions of the gaze of a wearer of this article, of this system or of this element. That of course presupposes that the geometric positioning of the article in relation to the eye of the wearer has been predetermined.

It will also be noted that both optical function and predetermined transmission parameter are here obtained thanks to machining steps, by surfacing the faces with the surfacing (or turning) machine 21, which is able to process either simple surfaces or complex surfaces, generally called free form surfaces, each with an high accurate level.

Thanks to such machining steps by surfacing, the method according to the invention for instance allows to process a predetermined transmission parameter defined by any spatial variation of transmission on the face machined. In other words, any photochromic gradient, polarization gradient, localized polarizing, color gradient or tint gradient can be performed.

In other words, the predetermined transmission parameters to be conferred on the ophthalmic article 3 are characteristics of customization data amongst photochromic properties, and/or polarization properties, and/or color properties and/or tint properties, and/or specific wavelength transmission property.

The predetermined transmission parameters correspond either to a spatial variation of transmission or to a uniform transmission on the article 3.

Furthermore, the specific wavelength transmission property can correspond to a bad blue cut, or chrono blue wavelength cut, ultraviolet cut, or near infra-red cut.

It will also be noted that such machining steps can be performed either on at least one blank, that is to said a non-finished lens, or on a finished lens to which wearer wishes to modify at least the transmission properties.

Figure 3:
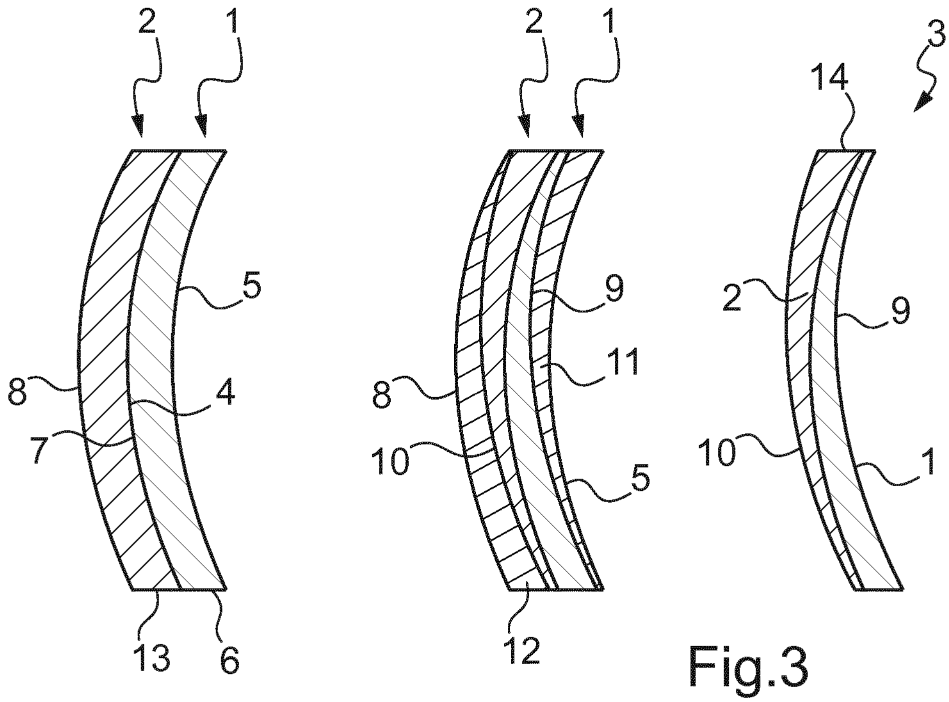

FIG. 3 shows an ophthalmic substrate formed as a single blank made from the first body 2 and the second body 1.

The first body 2 is made from a first material amongst one of the material mentioned above. The second body 1 is made from a second material amongst one of the material mentioned above.

Initially, the first body 2 has a first curved face 8 which is here convex, a second curved face 7, opposite to the first face 8, which is here concave, and a peripheral edge 13 which joins both the first and second faces 8 and 7.

Initially, the second body 1 has a first curved face 4 which is here convex, a second curved face 5, opposite to the first face 4, which is here concave, and a peripheral edge 6 which joins both the first and second faces 4 and 5.

Here, the first face 8 of the first body 2 forms a first external face of the single blank and the second face 5 of the second body 1 forms a second external face of the single blank, which is opposite to its first external face.

In other words, the second curved face 7 of the first body 2 and the first face 4 of the second body 1 are therefore inaccessible.

The second body 1 can be made by casting or injection process and the first body 2 can be a film integrated to the second body 1 during the casting or injection process, and/or the second body 1 can made by casting or injection process and the first body 2 can be a film laminated or coated onto the second body 1.

Then, a first zone 12 is removed from the first body 2 by surfacing the first external face 8 of the blank. The first external face 8 is surfaced according to the first geometry determined for providing the predetermined transmission parameters in order to obtain a first finished external face 10 of the ophthalmic article 3.

Then, a second zone 11 is removed from the second body 1 by surfacing the second external face 5 of the blank. The second external face 5 is surface according to the second geometry determined for providing an optical function in order to obtain a second finished external face 9 of the ophthalmic article 3, which is opposite to the first finished external face 10.

The second finished external face 9 of the ophthalmic article 3 joins the first finished external face 10 of the ophthalmic article 3 thanks to the finished peripheral edge 14.

The ophthalmic article 3 which is obtained has thus the desired optical function and the predetermined transmission parameter, and comprises the first body 2 which is made from the first material and which is machined according to the first geometry, and the second body 1 which is made from the second material and which is machined according to the second geometry.

As mentioned above, in the ophthalmic article 3, the predetermined transmission parameters can be characteristic of customization data amongst photochromic properties, and/or polarization properties, and/or color properties and/or tint properties and/or specific wavelength transmission property, and the optical function can be characteristic of prescription values associated with a wearer of the ophthalmic article 3.

Figure 4:
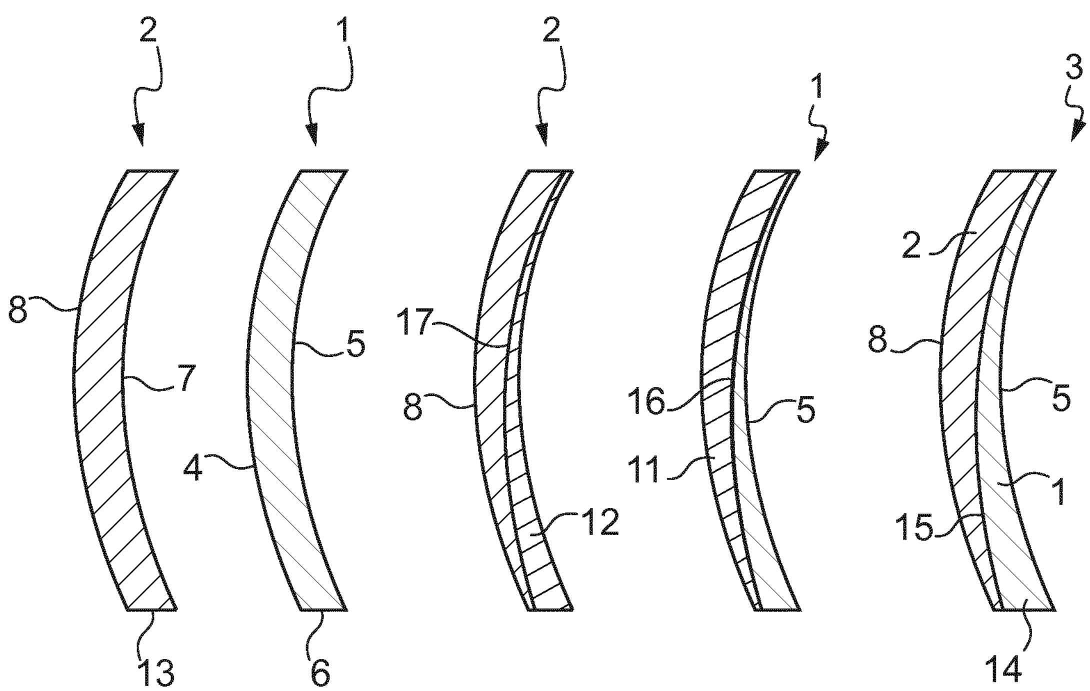

FIG. 4 differs from FIG. 3 in that the first body 2 and the second body 1 are separate and thus do not form a single blank, and in that the second curved face 7 of the first body 2 and the first face 4 of the second body 1 are therefore accessible.

The second body 1 can be made by casting or injection process and the first body 2 can be a film made separately.

Then, a first zone 12 is removed from the first body 2 by surfacing its second curved face 7 according to the first geometry determined for providing the predetermined transmission parameters in order to obtain a first finished internal face 17.

Then, a second zone 11 is removed from the second body 1 by surfacing its first curved face 4 according to the second geometry determined for providing the optical function in order to obtain a second finished internal face 16.

The first finished internal face 17 and the second finished internal face 16 are specifically designed and conformed so that so that the shapes thereof perfectly matches one with the other or are at least the closest as possible.

Then, the first body 2 and the second body 1, which are machined, are assembled together by putting into contact the first and second finished internal faces 16 and 17, and by fixing them together, in a securely fastened manner, in order to obtain the ophthalmic article 3.

The first and second bodies 2 and 1 can be fixed together thanks to a layer of glue 15 deposited on at least one of the first and second finished internal faces 16 and 17.

The first finished external face of the ophthalmic article 3 is thus formed by the first curved face 8 of the first body 2, while the second finished external face of the ophthalmic article 3 is thus formed by the second curved face 5 of the second body 1.

FIG. 5 is similar to FIG. 4 except that both first and second faces 8 and 7 of the first body 2 are surfaced according to the first geometry determined for providing the predetermined transmission parameters in order to obtain the first finished internal face 17 and the first finished external face 10.

Furthermore, both first and second faces 4 and 5 of the second body 1 are surfaced according to the second geometry determined for providing the optical function in order to obtain the second finished internal face 16 and the second finished external face 9.

In other words, the first zone 12 comprises two portions on each side of the first body 2 and the second zone 11 comprises also two portions on each side of the second body 1.

Then, the first body 2 and the second body 1, which are each machined on both sides, are assembled together by putting into contact the first and second finished internal faces 16 and 17, and by fixing them together, in a securely fastened manner, in order to obtain the ophthalmic article 3.

The first and second bodies 2 and 1 can be fixed together thanks to a layer of glue 15 deposited on at least one of the first and second finished internal faces 16 and 17.

The first finished external face of the ophthalmic article 3 is thus formed by the machined face 10 of the first body 2, while the second finished external face of the ophthalmic article 3 is thus formed by the machined faced 9 of the second body 1.

FIG. 6 is similar to FIG. 4 except that the first and second bodies 2 and 1, which are initially distinct, are assembled together before machining.

In other words, the first body 2 and the second body 1 are assembled together by putting into contact the second face 7 of the first body 2 and the first face 4 of the second body 1, and by fixing them together, in a securely fastened manner, in order to obtain a single blank.

The first and second bodies 2 and 1 can be fixed together thanks to a layer of glue 15 deposited on at least one of the second face 7 and the first face 4.

It will be noted that when the first and second bodies 2 and 1 are manufactured, the second face 7 of the first body 2 and the first face 4 of the second body 1 are specifically designed and conformed so that the shapes thereof perfectly matches one with the other or are at least the closest as possible.

Then, similarly to FIG. 3, a first zone 12 is removed from the first body 2 by surfacing the first external face 8 of the blank. The first external face 8 is surfaced according to the first geometry determined for providing the predetermined transmission parameters in order to obtain a first finished external face 10 of the ophthalmic article 3.

Then, a second zone 11 is removed from the second body 1 by surfacing the second external face 5 of the blank. The second external face 5 is surface according to the second geometry determined for providing an optical function in order to obtain a second finished external face 9 of the ophthalmic article 3, which is opposite to the first finished external face 10.

Figure 7:
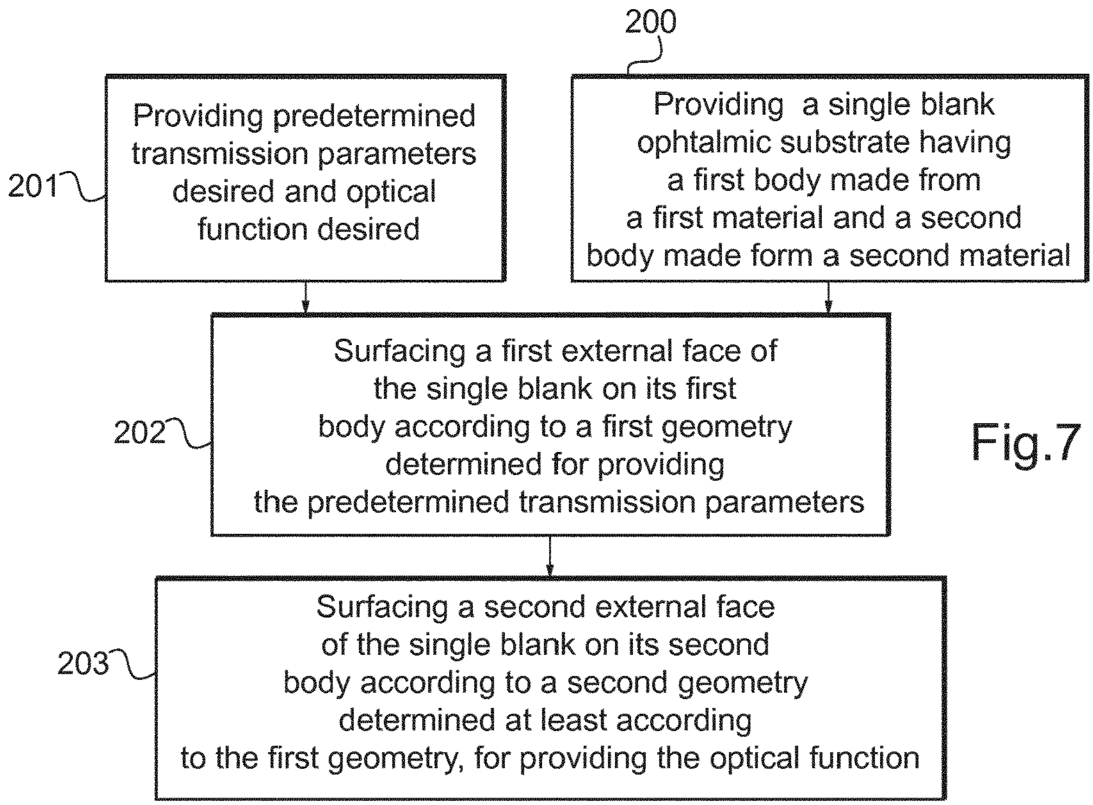
FIGS. 7 to 10 are block diagrams illustrating various operating steps of the method for manufacturing an ophthalmic article with the machine illustrated in FIG. 1.

FIG. 7 shows the main steps of operation of the method to obtain an ophthalmic lens 3, for instance as described in reference to FIG. 3.

The method comprises the step 200 of providing the single blank ophthalmic substrate having the first body 2 and the second body 1 made respectively form the first and second material.

The method further comprises the step 201 of providing predetermined transmission parameters desired and optical function desired and to confer to the single blank in order to obtain the ophtalmic article 3.

The method further comprises the step 202 of surfacing the first face 8 of the first body 2 according to the first geometry determined for providing said predetermined transmission parameter, in order to remove the first zone 12 and to obtain the first finished external face 10 of the ophthalmic article 3.

The method further comprises the step 203 of surfacing the second face 5 of the second body 1 according to the second geometry determined for providing an optical function, in order to remove the second zone 11 and to obtain the second finished external face 9 of the ophthalmic article 3.

Figure 8:
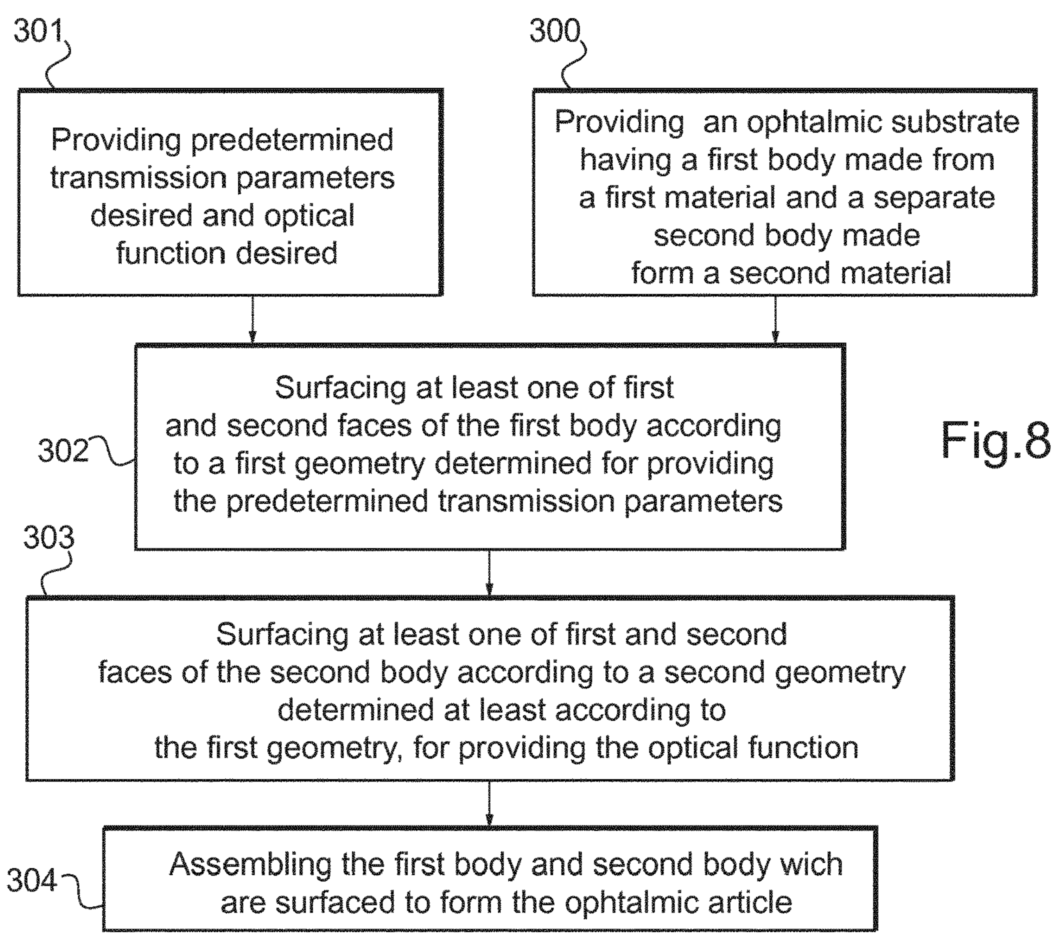

FIG. 8 shows the main steps of operation of the method to obtain an ophthalmic lens 3, for instance as described in reference to FIGS. 4 and 5.

The method comprises the step 300 of providing the two separate first body 2 and second body 1 made respectively form the first and second material.

The method further comprises the step 301 of providing predetermined transmission parameters desired and optical function desired and to confer to the separate bodies in order to obtain the ophtalmic article 3.

The method further comprises the step 302 of surfacing at least one of the first face 8 and the second face of the first body 2 according to the first geometry determined for providing said predetermined transmission parameter, in order to remove the first zone 12 having one or a plurality of portions, and to obtain at least one of the first finished internal face 17 and first finished external face 10 of the ophthalmic article 3.

The method further comprises the step 303 of surfacing at least one of the first face 4 and second face 5 of the second body 1 according to the second geometry determined for providing an optical function, in order to remove the second zone 11 having one or a plurality of portions, and to obtain at least one of the second finished internal face 16 and second finished external face 9 of the ophthalmic article 3.

The method further comprises the step 304 of assembling together the first body 2 and the second body 1 by putting into contact either the first and second faces 4 and 7 or the first and second finished internal faces 16 and 17, respectively of the first and second bodies 2 and 1, and by fixing them together, in a securely fastened manner, in order to obtain the ophthalmic article 3.

As described above, the second face 7 or the first finished internal face 17 of the first body 2 and the first face 4 or the second finished internal face 16 of the second body 1 are specifically designed and conformed so that so that the respective shapes thereof perfectly matches one with the other or are at least the closest as possible.

Figure 9:
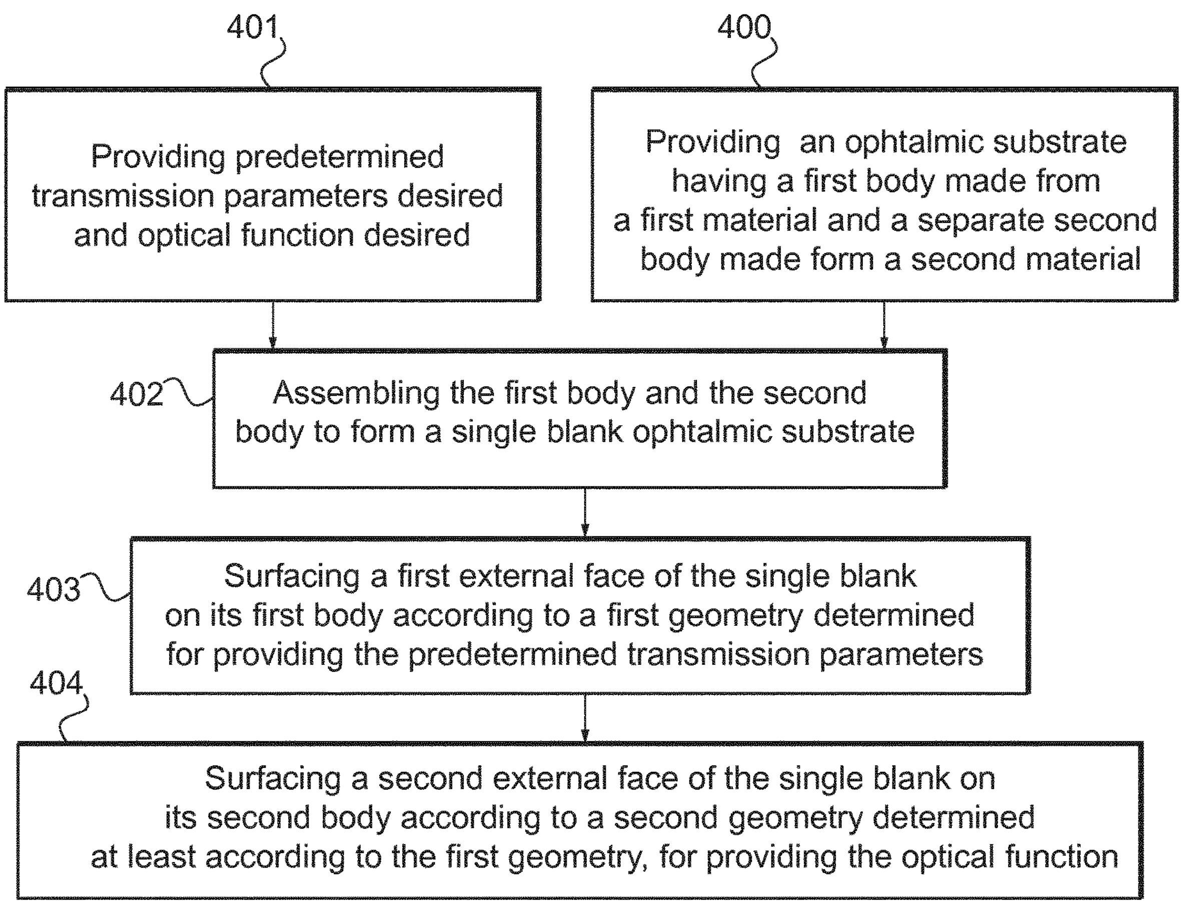

FIG. 9 shows the main steps of operation of the method to obtain an ophthalmic lens 3, for instance as described in reference to FIG. 6.

The method comprises the step 400 of providing the two separate first body 2 and second body 1 made respectively form the first and second material.

The method further comprises the step 401 of providing predetermined transmission parameters desired and optical function desired and to confer to the separate bodies in order to obtain the ophtalmic article 3.

The method further comprises the step 402 of assembling together the first body 2 and the second body 1 by putting into contact the first and second faces 4 and 7 respectively of the first and second bodies 2 and 1, and by fixing them together, in a securely fastened manner, in order to obtain the ophthalmic article 3.

The method further comprises the step 403 of surfacing the first face 8 of the first body 2 according to the first geometry determined for providing said predetermined transmission parameter, in order to remove the first zone 12 and to obtain the first finished external face 10 of the ophthalmic article 3.

The method further comprises the step 404 of surfacing the second face 5 of the second body 1 according to the second geometry determined for providing an optical function, in order to remove the second zone 11 and to obtain the second finished external face 9 of the ophthalmic article 3.

Figure 10:
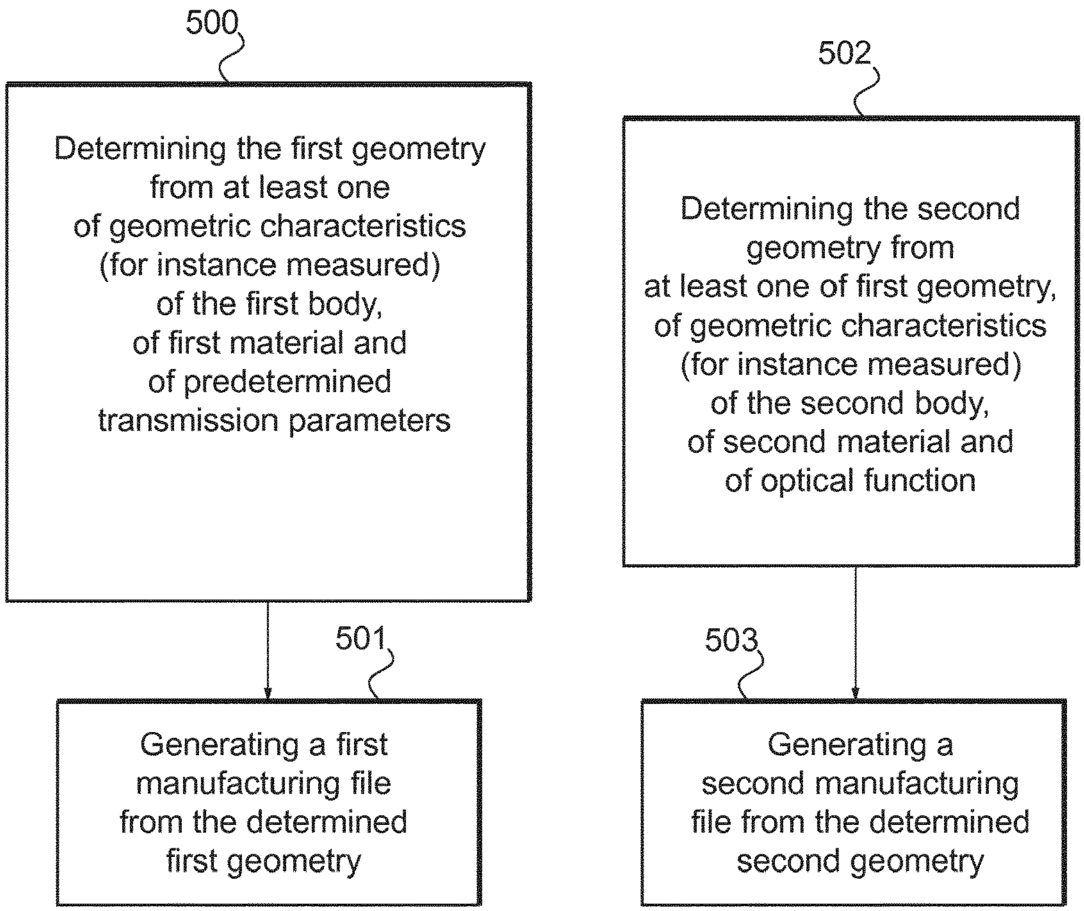

FIG. 10 shows a particular embodiment to determine the first geometry and the second geometry.

The method may comprise a step 500 of determining the first geometry from at least one of geometric characteristics of the first body 2, of the first material of the first body 2 and of the predetermined transmission parameters to confer.

The step 500 of determining the first geometry may comprise a step of measuring the geometric characteristics of the first body 2.

For instance, such a step can be made thanks to a geometrical measurement device using for instance a three-dimensionals technology or a deflectometry technology.

The method may further comprise a step 501 of generating a manufacturing file from the first geometry and configuring operational parameters for manufacturing the first body 2.

Such manufacturing file and operational parameters are able to be received and processed by the machine 21 illustrated in FIG. 1.

The method may further comprise a step 502 of determining the second geometry from at least one of the first geometry of the first body 2, of geometric characteristics of the second body 1, of the second material of the second body 1 and of the optical function to confer.

The step 502 of determining the second geometry comprises a step of measuring the geometric characteristics of the second body 1 and/or a step of measuring the first geometry of the first body 2 machined.

The method may further comprise a step 503 of generating a manufacturing file from the second geometry and configuring operational parameters for manufacturing the second body 1.

Such manufacturing file and operational parameters are also able to be received and processed by the machine 21 illustrated in FIG. 1.

Figure 11:
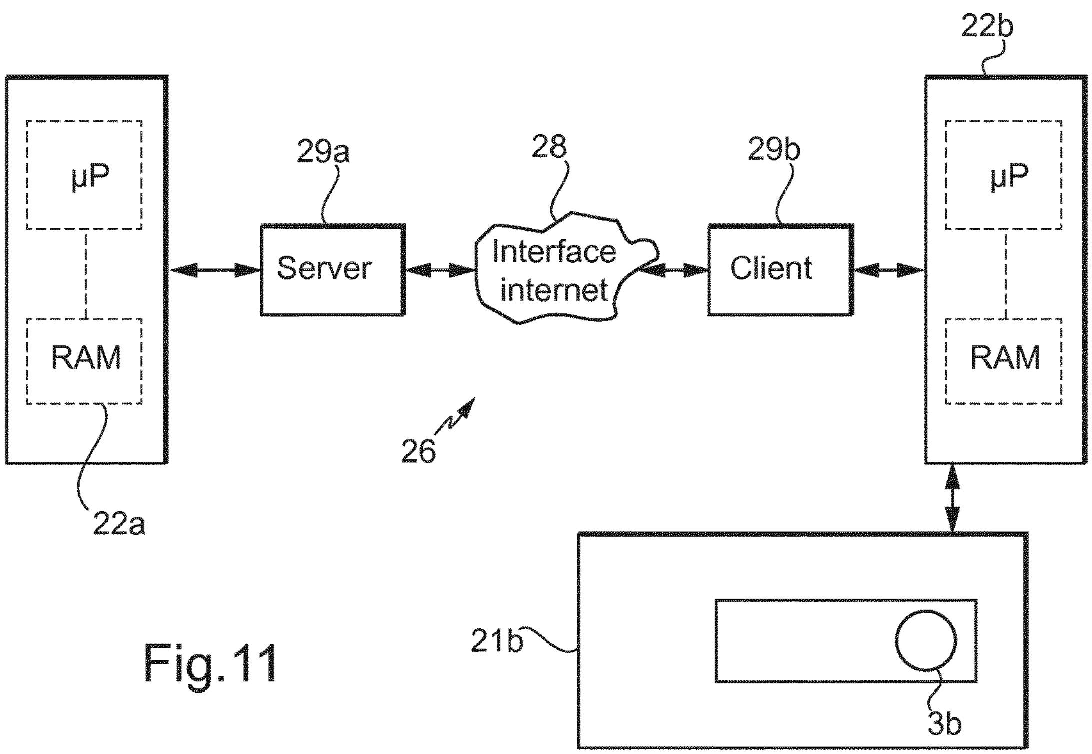
FIG. 11 diagrammatically shows a client-server communication interface comprising system parts configured for transferring at least configuration parameters determined by the method according to the invention to a remote data processing system.

FIG. 11 shows a client-server communication interface 26 comprising a so-called supplier side 29*a* and another, so-called client side 29*b*, and these two sides communicating via an internet interface 28.

The supplier side comprises a server 29*a* linked to a data processing system or a control unit 22*a* of the same type as that in FIG. 1, this server 29*a* being configured to communicate with the internet interface 28.

The client side 29*b* is configured to communicate with the internet interface 28, and is linked to a data processing system or a control unit 22*b* of the same type as that of the supplier side.

Further, the client-side control unit 22*b* is linked to a manufacturing machine 21*b* of the same type as that in FIG. 1 for manufacturing at least the first face 4*b* the ophthalmic substrate 1*b*.

The control unit 22*b* is configured for receiving, on the client side, for instance the optical function desired and/or the predetermined transmission parameter desired and/or first geometry and/or the second geometry.

The control unit 22*b*, using the internet 28 and server 29*a* interface, sends the data received to the supplier-side control unit 22*a* for the determination of the manufacturing file and operational parameters.

The control unit 22*a* executes the computer program that it contains in order to implement the method according to the invention and thus deduce the manufacturing files and operational parameters.

Using the server 29*a* and the internet interface 28, the control unit 22*a* sends the manufacturing file and operational parameters to the client-side data control unit 22*b*.

The control unit 22*b* is configured to execute software for implementing a method for manufacturing the substrate 1*b* by using the manufacturing file and operational parameters in order manufacture the ophthalmic article 3*b*.

In variant which are not illustrated:

- the first body and the second body have different shapes than the shape illustrated in FIGS. 3 to 6, for instance, the first face of the first body is concave or planar rather than convex, the second face of the first body is convex or planar rather than concave, the first face of the second body is concave or planar rather than convex, and the second face of the second body is convex or planar rather than concave;
- the first and second geometry can be representative of thicknesses of the first and second bodies;
- the machine illustrated in FIG. 1 can be used only for surfacing the first body, or only for surfacing the second body;
- the method can further comprise a step of edging the ophthalmic article and/or edging both the first and second bodies separately;
- the method can further comprise a step of coating the ophtalmic article and/or at least one of the first and second bodies (before or after surfacing steps) with a functional coating composition or with a functional wafer;
- the method can further comprise a step of marking the ophtalmic article and/or at least one of the first and second bodies before or after surfacing steps;
- the method can further comprise a step of blocking the first and/or the second body before the steps of surfacing;
- the first and second body can have each at least one predetermined optical function and/or predetermined transmission properties before surfacing; and/or
- the first and second body can be made each from a plurality of materials.

The invention claimed is:

1. A method for manufacturing an ophthalmic article having at least one optical function and at least one predetermined transmission parameter, the method comprising:

surfacing at least a first face of a first body of said ophthalmic article, made from a first material, according to a first geometry determined for providing said at least one predetermined transmission parameter;

surfacing at least a second face of a second body of said ophthalmic article, made from a second material, according to a second geometry determined at least according to said first geometry, for providing said at least one optical function;

determining said first geometry from at least one of geometric characteristics of said first body, of said first material of said first body, and of said predetermined transmission parameters to confer;

determining said second geometry from at least one of said first geometry of said first body, of geometric characteristics of said second body, of said second material of said second body and of said optical function to confer;

providing said first body which has a first external face and a first internal face;

providing said second body which has a second external face and a second internal face, wherein at least the first internal face and the second internal face are obtained by surfacing; and assembling said first and second bodies which are machined by surfacing, by putting into contact said first and second internal faces; and wherein said predetermined transmission parameters to be conferred on said ophthalmic article is customization data further defined as photochromic properties, polarization properties, color properties, tint properties, and/or specific wavelength transmission properties; and wherein said optical function to be conferred on said ophthalmic article is a prescription value associated with a wearer of said ophthalmic article.

2. The method according to claim 1, wherein said at least one predetermined transmission parameter corresponds either to a spatial variation of transmission on said ophthalmic article or to a uniform transmission on said ophthalmic article.

3. The method according to claim 1, comprising the step of providing a single blank made from said first and second bodies.

4. The method according to claim 3, wherein said second body is made by casting or injection process and said first body is a film integrated to said second body during said casting or injection process, and/or said second body is made by casting or injection process and said first body is a film laminated or coated onto said second body.

5. The method according to claim 1, wherein said step of determining said first geometry comprises a step of measuring said geometric characteristics of said first body and/or wherein said step of determining said second geometry comprises a step of measuring said geometric characteristics of said second body and/or a step of measuring said first geometry.

6. The method according to claim 1, wherein both steps of surfacing are carried out with a digital surfacing machine.

7. An ophthalmic article having at least one optical function and at least one predetermined transmission parameter, comprising a first body made from a first material and a second body made from a second material, wherein the first body comprises a first face having a first geometry determined for providing said predetermined transmission parameters and obtained by surfacing, and the second body comprises a second face having a second geometry determined at least according to said first geometry, for providing said optical function, and obtained by surfacing, wherein said ophthalmic article is produced by the method of claim 1.

8. The ophthalmic article according to claim 7, wherein said first material is at least one of a polarizing material, photochromic material, tint material or color material, and/or said second material is at least one of a polarizing material, photochromic material, tint material or color material, or transparent material and/or said first and second materials are similar or different.

9. The method of claim 6, wherein the digital surfacing machine surfaces said first and second bodies with an accurate level from about 1 μm to about 300 μm and confers to said ophthalmic article an optical function and a predetermined transmission parameter corresponding to a spatial variation of transmission between about 100% to about 0%.

10. A method for manufacturing an ophthalmic article having at least one optical function and at least one predetermined transmission parameter, the method comprising:

surfacing at least a first face of a first body of the ophthalmic article, made from a first material, according to a first geometry determined for providing the at least one predetermined transmission parameter;

surfacing at least a second face of a second body of the ophthalmic article, made from a second material, according to a second geometry determined at least according to the first geometry, for providing the at least one optical function;

determining the first geometry from at least one of geometric characteristics of the first body, of the first material of the first body, and of the at least one predetermined transmission parameter to confer;

determining the second geometry from at least one of the first geometry of the first body, of geometric characteristics of the second body, of the second material of the second body and of the at least one optical function to confer;

providing the first body which has a first external face and a first internal face;

providing the second body which has a second external face and a second internal face, wherein at least the first internal face and the second internal face are obtained by surfacing; and assembling the first body and the second body, which are machined by surfacing, by putting into contact the first internal face and the second internal face.

11. The method according to claim 10, wherein:

the at least one predetermined transmission parameter to be conferred on the ophthalmic article is customization data further defined as photochromic properties, polarization properties, color properties, tint properties, specific wavelength transmission properties, or a combination thereof; or the at least one optical function to be conferred on the ophthalmic article is a prescription value associated with a wearer of the ophthalmic article.

12. A method associated with an ophthalmic article, the method comprising:

providing a first body including a first material and having a first external face and a first internal face;

determining a first geometry based on one or more first geometric characteristics of the first body, the first material, at least one transmission parameter to confer on the ophthalmic article, or a combination thereof;

surfacing the first internal face according to the determined first geometry to produce a machined first internal face of the first body;

providing a second body including a second material having a second external face and a second internal face, determining a second geometry based on the first geometry, one or more second geometric characteristics of the second body, the second material, at least one optical function to confer on the ophthalmic article, or a combination thereof;

surfacing the second internal face of the second body according to the second geometry to produce a machined second internal face of the first body; and coupling the first body and the second body via the machined first internal face and the machined second internal face.

13. The method according to claim 12, wherein the first geometry is determined based on the one or more first geometric characteristics of the first body, the first material, and the at least one transmission parameter.

14. The method according to claim 12, wherein the second geometry is determined based on the first geometry, the one or more second geometric characteristics of the second body, the second material, and at least one optical function.

15. The method according to claim 12, wherein coupling the first body and the second body includes coupling the first body and the second body such that the machined first internal face is in contact with the machined second internal face.

16. The method according to claim 12, further comprising, after coupling the first body and the second body, producing the ophthalmic article having the at least one optical function and the at least one transmission parameter.

17. The method according to claim 12, wherein:

the first geometry is determined to provide the at least one transmission parameter; and the second geometry is determined based on the first geometry and to provide the at least one optical function.

18. The method according to claim 12, wherein the first material is a different material than the second material.

19. The method according to claim 12, wherein the at least one transmission parameter to be conferred on the ophthalmic article is based on customization data associated with photochromic properties, polarization properties, color properties, tint properties, specific wavelength transmission properties, or a combination thereof.

20. The method according to claim 12, wherein the at least one optical function to be conferred on the ophthalmic article is based on a prescription value associated with a wearer of the ophthalmic article.

* * * * *